Figure 1:
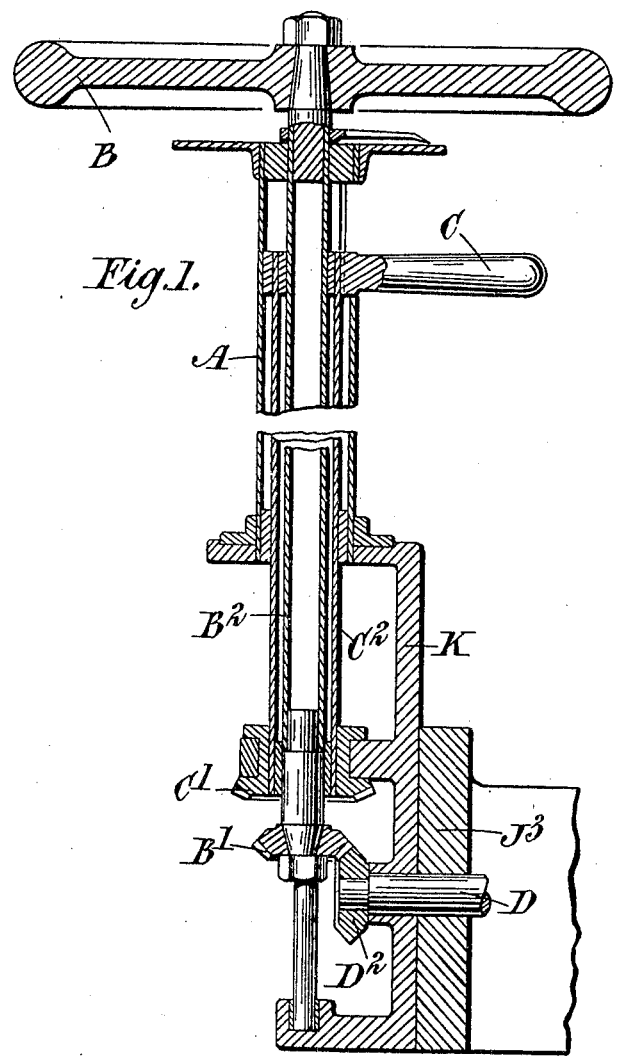

No. 856,380. PATENTED JUNE 11, 1907.
C. WICKSTEED.
CONTROLLING MECHANISM FOR SPEED GEARS.
APPLICATION FILED APR. 2, 1907.

3 SHEETS—SHEET 1.

Witnesses

Inventor:
Charles Wicksteed

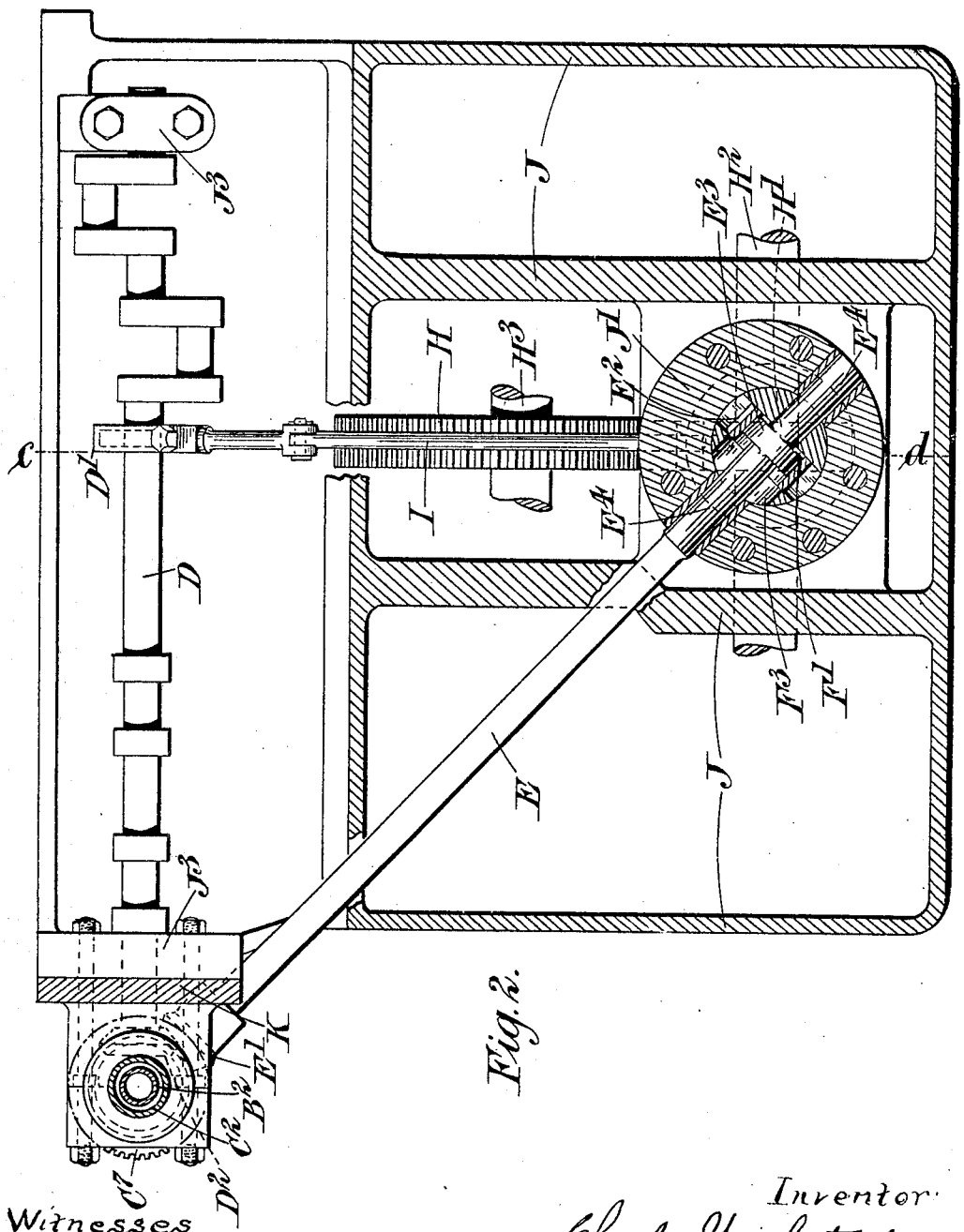

No. 856,380. PATENTED JUNE 11, 1907.
C. WICKSTEED.
CONTROLLING MECHANISM FOR SPEED GEARS.
APPLICATION FILED APR. 2, 1907.
3 SHEETS—SHEET 3.
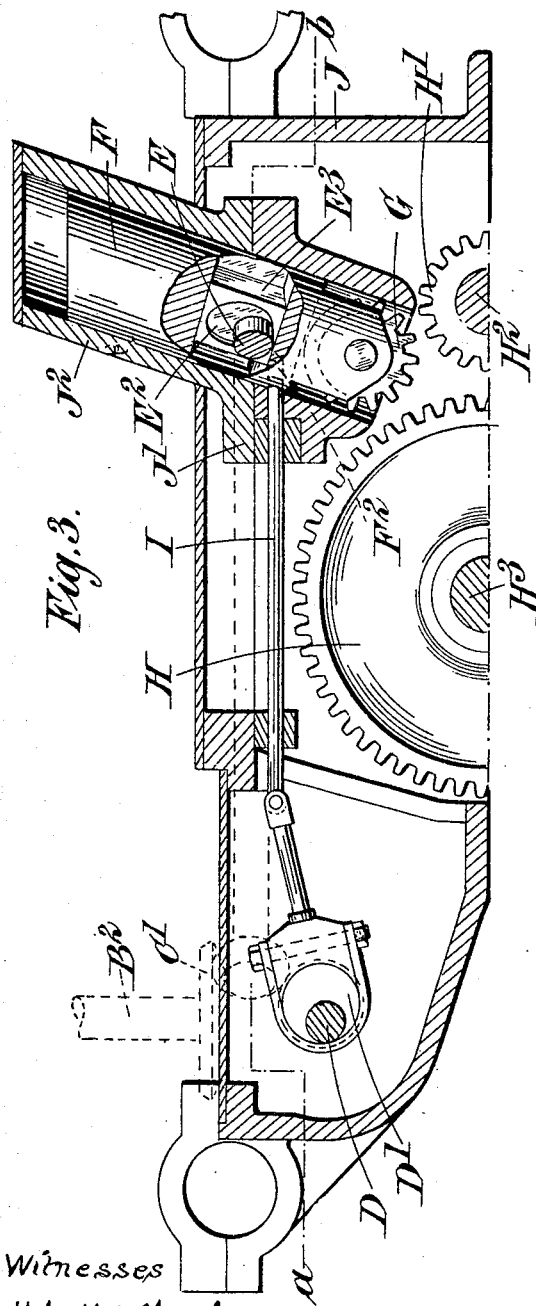
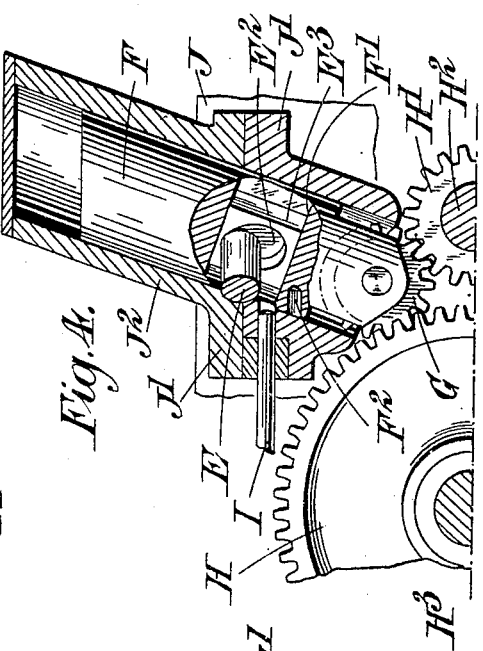
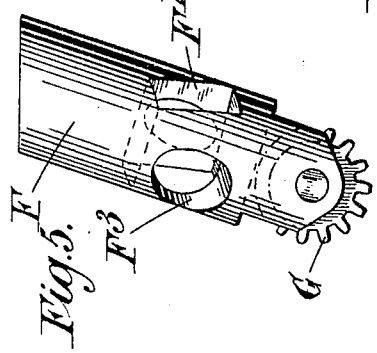
Witnesses
Inventor:
Charles Wicksteed
Church & Church
his attys

UNITED STATES PATENT OFFICE.

CHARLES WICKSTEED, OF KETTERING, ENGLAND.

CONTROLLING MECHANISM FOR SPEED-GEARS.

No. 856,380.  Specification of Letters Patent.  Patented June 11, 1907.

Application filed April 2, 1907. Serial No. 365,994.

*To all whom it may concern:*

Be it known that I, CHARLES WICKSTEED, a subject of the King of England, residing at Kettering, in the county of Northampton, England, have invented certain new and useful Improvements in Controlling Mechanism for Speed-Gears, of which the following is a specification.

This invention relates to speed gears especially those used in motor vehicles and, although I do not confine it to use with any particular gear, it is particularly adapted for gears of the type described in my previous specification Serial No. 329937, and to that specification I refer for a general description of one type of gear to which the present invention is particularly applicable.

The present invention deals with the reversing gear, the mechanism for preventing the reverse from being brought into operation when any of the other speeds, except the slow, are in, and an alteration in the disposition of some of the parts described in the above mentioned specification Serial No. 329937, whereby some of those parts, and particularly the crank shaft which effects the changes of gear, are enabled to be placed inside the gear case or box instead of outside as indicated in the previous specification, and with also the necessary handles and rods for manipulating the whole change speed gear including the reverse and safety stops assembled conveniently on a telescopic or rigid pillar.

The invention will be best understood by reference to the accompanying drawings in which:—

Figure 1 is a vertical section through the pillar and operating mechanism by which the gears are both changed and locked; Fig. 2 is a plan partly in section on the line $a$—$b$ of Fig. 3; Fig. 3 is a vertical section on the line $c$—$d$ of Fig. 2; Fig. 4 is a vertical section showing the reversing gear in operation, and Fig. 5 is an elevation of a detail of the reversing mechanism.

Like letters represent like parts throughout the drawings.

A (Fig. 1) is the column or standard carrying the reverse and speed gear controlling shafts $C^2$ and $B^2$ respectively; B is the hand wheel by which the gears are changed, and C is the reversing handle.

D is the controlling member or crank-shaft which operates mechanism such as described in the previously mentioned specification Serial No. 329937, and $D^1$ is an eccentric thereon for operating a stop presently to be described, which prevents the reverse mechanism from coming into operation when the second and higher speed gears are engaged. This crank-shaft *per se* does not form part of the present invention, having been described in the previous specification. The shaft D is operated by the hand-wheel B through the shaft $B^2$ and the bevel gears $B^1$ $D^2$; for the purposes of this present specification this connection is important as showing that the hand wheel B operates the eccentric $D^1$ and stop I.

The shaft or spindle E (Fig. 2) is turned by the bevel wheel $E^1$ engaging with the bevel wheel $C^1$ (Fig. 1) on the tubular shaft or sleeve $C^2$ concentric with the shaft $B^2$ and operated by the handle C. The function of the shaft E is to operate the eccentric $E^2$ (Figs. 2, 3 and 4) upon which is the block $E^3$ which travels sidewise in a transverse slot or way $F^1$ in the plunger or sliding member F. Consequently as the eccentric $E^2$ is rotated, the block $E^3$ is moved both horizontally and vertically; horizontally in the slot $F^1$ without moving the plunger F, and vertically with the vertical movement of the plunger F. The plunger F carries the reverse gear wheel or pinion G, which, when the plunger F is down, is in engagement with other gear wheels H and $H^1$ used during the reverse movement. These wheels are opposed to each other but do not mesh together except through the medium of the third wheel G when this is brought into operative position by the sliding member. One of the wheels, in this case the wheel $H^1$, is carried by a driving element, viz. the shaft $H^2$, and the other by a driven element, *i. e.* the shaft $H^3$. In Fig. 3 the plunger F is shown in its raised position, and consequently the wheel G is not in engagement with the wheels H and $H^1$, and the reverse mechanism is not in operation.

In the plunger F is a locking recess or socket $F^2$ into which, when the plunger is raised, the rod or detent I enters, as shown in Fig. 3. It will be observed that the recess $F^2$ is of such length that, the movement of the detent I being controlled by the eccentric $D^1$ and consequently gradual, the detent I remains in the recess $F^2$ during the engagement of all the forward speed gears, except the slow, and is only free when the hand-wheel B, and consequently the shaft D, are turned to such a position that all the forward gears, except the slow, are disengaged; it is therefore only when those wheels are disengaged that the plunger F is free to be moved to place the reverse gears in engagement. The reason why the detent need not be engaged when the slow speed ahead is in use, is that a clutch in the gear (the clutch G of the previous specification Serial No. 329937), is disengaged when the reverse clutch is engaged so that if wheel G happens to be left in engagement with H and H¹ no breakage occurs.

The detent I is carried in fixed guides formed by portions of the casing J and one of the circular flanges J¹ of the column J² wherein the plunger F is carried and it is thus alined to enter the recess F² when the plunger is in the raised position.

It will be seen from Fig. 5 that besides the slot or way F¹ in the plunger F there is a way which is transverse to and intersects the way F¹, so that two holes F³ F³ (one shown in full and the other dotted) are formed to accommodate the shaft E and allow the plunger F to rise and fall without interfering with the shaft E. The hole F³ is of such dimensions as to admit the eccentric E² when entering this in the block E³. The bearings E⁴ for the end of the shaft E are carried, as shown in Fig. 2, in any appropriate part as, for example, in the circular flanges J¹ of the short column or socket J² in which the plunger F works, this socket J² being connected with the general gear-box or casing J. The spindle E is set obliquely to the shaft D and one end of each extends beyond the casing J. These projecting ends both enter a bracket K secured to the casing and whereon the standard A which supports the shafts B² and C² is mounted.

As will be seen from Fig. 2, the crank shaft D is carried in bearings J³ of the gear-box, and lies entirely inside the gear-box, by reason of which all its parts are fully lubricated and protected from the dust and may operate in an oil bath.

The operation is as follows:—When it is desired to apply the reverse, the hand-wheel B is turned so that the eccentric D¹ upon the shaft D, withdraws the detent I, when the handle C can be turned, whereby the bevels C¹ and E¹ cause the shaft E and the eccentric E² to rotate. The eccentric thus lowers the plunger F until the reverse wheel G engages with H and H¹ so that when the crank-shaft throws the reverse clutch into gear, the reverse motion is in full operation. To disengage the reverse, the handle C is moved in the opposite direction, the plunger F raised and the hand-wheel B then turned so as to engage the desired clutches for driving ahead. The movement of the eccentric D¹ is such that it advances the detent I into the recess F² before any of the forward gear clutches, except the slow, are engaged.

The cranks are placed in such a position in relation to the eccentric D¹, that the detent I is always in the recess F² except when the reverse or slow-speed clutch is in gear. None of the other forward gears can therefore be put in before the reverse wheel G is raised out of gear sufficiently for the detent I to enter the recess F². The reason why the slow speed may be put-in with the reverse in gear is for convenience of tacking; the reason why the faster speed may not be put in then is to prevent the throwing-in of the reverse accidentally from a fast speed, the position of the crank-shaft being the same for the reverse as for the neutral. It is neutral if the reverse idle wheel is out, and reverse if it is put in.

What I claim as my invention and desire to secure by Letters Patent is:—

1. In controlling mechanism for speed gear the combination of, a controlling member (D) rotatable for the purpose of changing the speeds, a sliding member separately operated for controlling the reverse and having in it a locking recess, a detent alined to enter the recess in the sliding member when the latter is in one position, an eccentric body carried by the controlling member and operatively connected with the detent so that it advances it into the recess in the sliding member or withdraws it therefrom according to the position of the controlling member, and a fixed guide for the detent, substantially as set forth.

2. In controlling mechanism for speed gear the combination of, a controlling member (D) rotatable for the purpose of changing the speeds, a sliding member separately operated for controlling the reverse and having in it a locking recess, a detent alined to enter the recess in the sliding member when the latter is in one position, an eccentric body carried by the controlling member and operatively connected with the detent so that it advances it into the recess in the sliding member or withdraws it therefrom according to the position of the controlling member, a fixed guide for the detent, a gear wheel carried by a driving element, a second gear-wheel opposed to the first but not in mesh therewith and carried by an element to be driven, and a third gear-wheel carried by the sliding member aforesaid and adapted to mesh with both of these gear-wheels and thereby operatively connect them together when the sliding member is in such position that its recess does not aline with the aforesaid detent, substantially as set forth.

3. In controlling mechanism for speed gear the combination of, a controlling member (D) rotatable for the purpose of changing the speeds, a sliding member for controlling the reverse and having in it a locking recess, an eccentric body operatively engaging the sliding member for the purpose of advancing or withdrawing it, means independent of the controlling member (D) for imparting rotary movement to this eccentric, a detent alined to enter the recess in the sliding member when the latter is in one position, an eccentric body carried by the controlling member and operatively connected with the detent so that it advances it into the recess in the sliding member or withdraws it therefrom according to the position of the controlling member, and a fixed guide for the detent, substantially as set forth.

4. In controlling mechanism for speed gear the combination of, a controlling member (D) rotatable for the purpose of changing the speeds, a sliding member for controlling the reverse and having in it a locking recess, a block mounted in and free to slide but not to rotate in a recess in the sliding member disposed transversely to the direction of movement of the same, an eccentric body engaging this block, means independent of the controlling member (D) for imparting rotary movement to this eccentric body, whereby the sliding member is advanced or withdrawn, a detent alined to enter the locking recess in the sliding member when the latter is in one position, an eccentric body carried by the controlling member and operatively connected with the detent so that it advances it into the locking recess in the sliding member or withdraws it therefrom according to the position of the controlling member, and a fixed guide for the detent, substantially as set forth.

5. In controlling mechanism for speed gear the combination of, a controlling member (D) rotatable for the purpose of changing the speeds, a sliding member for controlling the reverse and having in it a locking recess, a block mounted in and free to slide but not to rotate in a way cut through the sliding member transversely to the direction of its movement, a second way transverse to the first and intersecting the same, an operating spindle (E) alined with this intersecting way, an eccentric on this spindle adapted to engage a corresponding orifice in the block, the intersecting way being of sufficient dimensions to admit the eccentric for the purpose of entering the same in the block, means independent of the controlling member (D) for imparting rotary movement to the spindle (E) so that its eccentric advances or withdraws the sliding member, a detent alined to enter the locking recess in the sliding member when the latter is in one position, an eccentric body carried by the controlling member and operatively connected with the detent so that it advances it into the locking recess in the sliding member or withdraws it therefrom according to the position of the controlling member, and a fixed guide for the detent, substantially as set forth.

6. In controlling mechanism for speed gear the combination of, a controlling member (D) rotatable for the purpose of changing the speeds, a sliding member for controlling the reverse and having in it a locking recess, a spindle (E) operatively connected with this sliding member so that when the spindle is rotated endwise movement is imparted to the member, a controlling shaft ($C^2$) for imparting rotary movement to this spindle, a controlling shaft ($B^2$) concentric with the shaft ($C^2$) and operatively connected with the controlling member (D) for the purpose of rotating the latter, a detent alined to enter the locking recess in the sliding member when the latter is in one position, an eccentric body carried by the controlling member and operatively connected with the detent so that it advances it into the locking recess in the sliding member or withdraws it therefrom according to the position of the controlling member, and a fixed guide for the detent, substantially as set forth.

7. In controlling mechanism for speed gear the combination of, a controlling member (D) rotatable for the purpose of changing the speeds, a sliding member for controlling the reverse and having in it a locking recess, a spindle (E) set obliquely to the controlling member (D) and operatively connected with the sliding member so that when rotated it moves this member endwise, a controlling shaft $B^2$ situated approximately at right angles to the controlling member (D) and operatively connected therewith so that rotary movement of the shaft imparts rotary movement to the member, a tubular shaft ($C^2$) concentric with the shaft ($B^2$) and operatively connected with the spindle (E) so that rotary movement of this shaft imparts rotary movement to the spindle, an operating handle for each of the controlling shafts, a detent alined to enter the locking recess in the sliding member when the latter is in one position, an eccentric body carried by the controlling member and operatively connected with the detent so that it advances it into the locking recess in the sliding member or withdraws it therefrom according to the position of the controlling member, and a fixed guide for the detent, substantially as set forth.

8. In controlling mechanism for speed gear the combination of, a casing for the change-speed wheels, a controlling member (D) rotatably mounted therein for the purpose of changing the speeds, a barrel ($J^2$) secured thereto and opening into the casing, a member slidably mounted in this barrel for controlling the reverse and having in it a locking recess, a transverse spindle (E) mounted at one end in the barrel and operatively engaged with the sliding member so that rotary movement of the spindle imparts endwise movement to the member, the other end of this spindle extending beyond the casing, a bracket secured to the casing and receiving the free end of the spindle (E) and one end of the controlling member (D), a vertical shaft (B²) mounted in this bracket and operatively engaged with the controlling member (D) so that rotary movement of one member imparts rotary movement to the other, a tubular shaft (C²) concentric with the shaft (B²) and also carried by the bracket such shaft being operatively connected with the spindle (E) so that rotary movement of the shaft imparts rotary movement to the spindle, an operating handle on the shaft (B²), an operating handle on the shaft (C²), a detent alined to enter the locking recess in the sliding member when the latter is in one position, an eccentric body carried by the controlling member and operatively connected with the detent so that it advances it into the locking recess in the sliding member or withdraws it therefrom according to the position of the controlling member, and a fixed guide for the detent, substantially as set forth.

In testimony whereof I have signed my name to this specification in the presence of two subscribing witnesses.

CHARLES WICKSTEED.

Witnesses:
A. M. HAYWARD,
W. H. DERRIMAN.